Aug. 17, 1954  C. W. KECK  2,686,445
CORE REMOVING TOOL FOR AUTOMOBILE TIRE VALVES
Filed Sept. 6, 1949

INVENTOR,
Cecil W. Keck.
BY Roy E. Hamilton,
Attorney.

Patented Aug. 17, 1954

2,686,445

UNITED STATES PATENT OFFICE 2,686,445

CORE REMOVING TOOL FOR AUTOMOBILE TIRE VALVES

Cecil W. Keck, Carterville, Mo.

Application September 6, 1949, Serial No. 114,215

3 Claims. (Cl. 81—3)

This invention relates to new and useful improvements in core removing tools for automobile tire valves, and has particular reference to the combination of a core removing tool with an ordinary tire pressure gauge of the piston type.

The principal object of the present invention is the provision, in combination with a tire gauge having a body member and a stem carried in said body member and extendable therefrom responsively to air pressure introduced into said body member, of a tire valve core removing tool carried at the extending end of said gauge stem.

Another object is the provision of a core removing tool of the character described formed at the end of the stem of a tire pressure gauge and utilizing certain characteristics of said gauge stem in the operations of the core removing tool. These characteristics include free axial rotation of the gauge stem in the gauge body, extendability of the gauge stem from the gauge body independently of air pressure, and the non-circular cross-sectional shape of the gauge stem, whereby finger holds are provided for rotating said gauge stem about its axis.

Other objects are simplicity and economy of construction, ease and convenience of operation, adaptability for use with one hand, and adaptability for use with various types of standard tire pressure gauges.

With these objects in view, as well as other objects which will appear in the course of the specification, reference will be had to the drawing, wherein.

Figure 1:
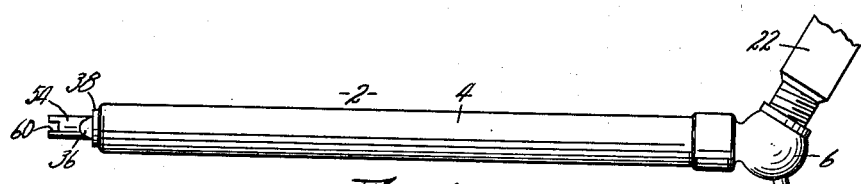
Figure 1 is a side elevation of a tire pressure gauge including a core removing tool embodying the present invention, with the gauge in operative relationship to a tire valve stem, shown fragmentarily.
Figure 2:
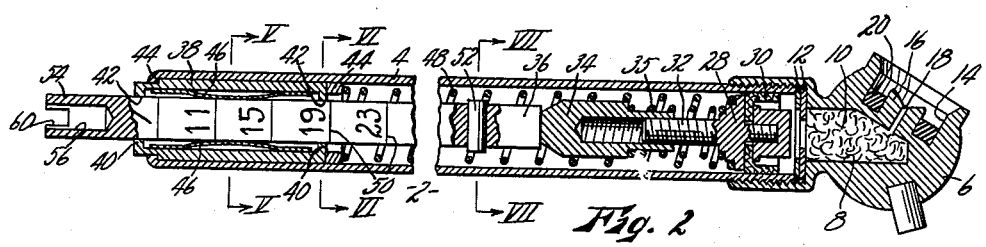
Figure 2 is an enlarged, foreshortened longitudinal mid-section taken through the device shown in Fig. 1.
Figure 3:
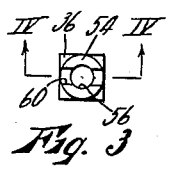
Figure 3 is an end view of the pressure gauge stem formed to present a core removing tool.
Figure 4:
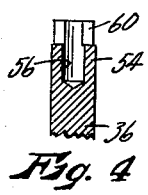
Figure 4 is a fragmentary section taken on line IV—IV of Fig. 3.
Figure 5:
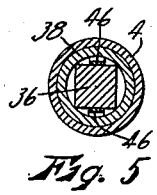
Figure 5 is a section taken on line V—V of Fig. 2.
Figure 6:
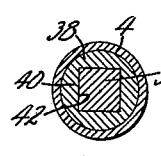
Figure 6 is a section taken on line VI—VI of Fig. 2.
Figure 7:
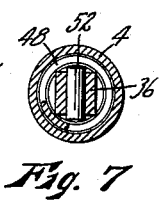
Figure 7 is a section taken on line VII—VII of Fig. 2.

Like reference numerals apply to similar parts throughout the several views, and the numeral 2 applies to a tire pressure gauge having a hollow cylindrical body member 4 open at both ends. At one end said body member is provided with a head 6 threaded securely thereon and having an internal recess 8 formed therein communicating with the body member. Said recess is filled with a packing material 10 of cotton or the like which is held in said recess by annular washers 12 disposed between head 6 and body member 4. Head 6 is also provided with an externally opening cylindrical recess 14 with its axis disposed angularly to the axis of body member 4. The head is formed to present a cylindrical depressor 16 disposed axially in recess 14, and said depressor has a passageway 18 formed therethrough communicating with recess 8. An annular washer 20 of soft rubber or the like is carried at the bottom of recess 14 around depressor 16. Thus when head 6 is positioned over the end of the inner tube valve stem 22 as shown in Fig. 1 depressor 16 pushes the stem 24 of the valve core insert 26 inwardly allowing air from the inner tube to escape through valve stem 22. Washer 20 forms a sealing contact with the outer end of stem 22. Air therefore passes through passageway 18, through packing 10, which filters foreign matter therefrom, and into body member 4.

Carried within cylindrical body member 4 is a piston 28, having a leather sealing disc 30, adapted to be advanced in body member 4 by air pressure entering through head 6. Extending forwardly from said piston coaxially with body member 4, and forming a part of said piston is a screw 32 on the forward end of which is threaded a head 34. A spring 35 disposed about screw 32 bears at one end against head 34 and at its opposite end against piston 28. Said head abuts at its forward end against the rearward end of a gauge stem 36 which is disposed coaxially with body member 4 and is preferably squared in cross-section as shown. Said gauge stem is sufficiently long to project outwardly from the forward end of body member 4 even when piston 28 is at the extreme rearward end of body member.

Gauge stem 36 is carried in a cylindrical sleeve 38 which is carried rotatably in body member 4 at the forward end thereof, said sleeve having end walls 40 having squared holes 42 formed therein for receiving stem 36 for longitudinal sliding movement. Sleeve 38 is prevented from moving longitudinally in body member 4 by its bearing at its forward end against a shoulder 44 formed in said body member, and at its rearward end against a ring 44 press fitted into said body member. A pair of leaf springs 46 carried in sleeve 38 bear frictionally against opposite sides of gauge stem 36. A helical spring 48 carried in body member 4 bears at its forward end against ring 44 and at its rearward end against piston 28.

Thus when air enters body member 4 behind piston 28, said piston and stem 36 will be moved forwardly, the distance depending on the pressure of the air and the modulus of spring 48. Indicia lines 50 are imprinted on the sides of stem 36 and are adapted to be read in conjunction with the forward end of sleeve 38. A pin 52, fixed transversely in stem 36 adjacent the rearward end thereof and projecting outwardly from the sides thereof, is adapted to contact the rearward end wall 40 of sleeve 38 to limit the forward movement of stem 36. When head 6 is removed from inner tube stem 22, piston 28 is returned to the rearward end of body member 4 by spring 48, but gauge stem 36 is frictionally retained at its greatest extension by springs 46 until it is pushed inwardly manually.

Figure 8:
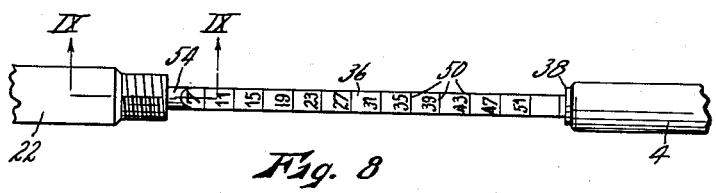
Figure 8 is a fragmentary showing of the tire pressure gauge with the stem thereof extended to engage the core of a tire valve.
Figure 9:
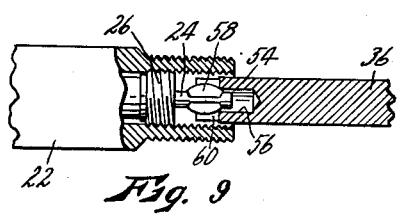
Figure 9 is an enlarged fragmentary section taken on line IX—IX of Fig. 8.

The structure so far described is well known, and no claim is made thereto except in combination with the core removing adaptation thereof as hereinafter described. The portions 54 of gauge stem which extends forwardly from body member 4 is rounded to a cylindrical shape having a diameter permitting it to be inserted longitudinally into inner tube valve stem 22, as shown in Figs. 8 and 9. Gauge stem 36 is bored axially from its end to provide a recess 56 adapted to receive the stem 24 of valve core 26. Said valve core stem is customarily flattened adjacent its outer end to provide a transverse enlargement 58. Gauge stem 36 is slotted diametrically at its end as at 60 to receive enlargement 58 of the valve core stem, as shown in Fig. 9, thus preventing relative rotation of the gauge stem and the valve core stem. Thus by turning the gauge stem manually, the valve core 26 may be inserted or removed from its operative position in inner tube stem 22.

The operation of the valve core removing tool utilizes several features of the pressure gauge itself. The separation of gauge stem 36 from piston 28 provides that the piston may be extended manually independently of air pressure behind the piston and without compressing spring 48. Thus the gauge stem may be extended to any distance most suitable for the operation of the core removing tool and will be frictionally retained at that point by springs 46. The free rotatability of gauge stem 36 provides that in the use of the core removing tool body member 4 may be grasped firmly with one hand by the operator, and gauge stem 36 rotated with the thumb and forefinger of the same hand. The square or non-circular shape of stem 36 provides finger holds whereby the stem may be grasped and turned with sufficient force to insert or remove the valve core.

The tire valve core removing tool thus disclosed is simple, efficient, very convenient to use, and may be combined with a tire pressure gauge as described at a nominal expense. While a specific embodiment of my invention has been shown, it is apparent that many minor changes of construction and operation could be made without departing from the spirit of the invention.

What I claim is:

1. In a valve core removing tool, a body member, and a stem carried for axial rotation and free longitudinal sliding movement in said body member and adapted to be extended longitudinally therefrom, the outer end of said stem being axially bored and transversely slotted to engage operatively the valve core stem of an automobile tire valve.

2. In a valve core removing tool, a body member, a stem carried for axial rotation and free longitudinal sliding movement in said body member and adapted to be extended longitudinally therefrom, the outer end of said stem being axially bored and transversely slotted to engage operatively the valve core stem of an automobile tire valve, and the shank of said gauge stem being non-circular in cross-sections whereby to provide fingerholds for manually rotating said stem relative to said body member, and resilient members carried by said body member and bearing frictionally against said stem to retain it against accidental longitudinal movement.

3. A valve core removing tool comprising a tubular body member, a sleeve disposed axially within said body member for axial rotation therein but secured against longitudinal movement, a polygonal stem extending axially through said sleeve for longitudinal sliding movement therein, one end of said stem extending outwardly from said body member, the bore of said sleeve conforming to the polygonal contour of said stem to prevent rotation of said stem relative to said sleeve, and springs carried by said sleeve and engaging said stem to load said stem frictionally against longitudinal movement, the extended end of said stem being formed to engage operatively the valve core stem of an automobile tire valve.

References Cited in the file of this patent

UNITED STATES PATENTS

| Number | Name | Date |
|---|---|---|
| 1,388,275 | Low | Aug. 23, 1921 |
| 1,567,192 | Richardson | Dec. 29, 1925 |
| 1,630,976 | Smith | May 31, 1927 |
| 1,803,373 | Wahl | May 5, 1931 |
| 2,049,532 | Williams | Aug. 4, 1936 |
| 2,054,138 | Sandell | Sept. 15, 1936 |
| 2,417,360 | Heintzelman | Mar. 11, 1947 |

FOREIGN PATENTS

| Number | Country | Date |
|---|---|---|
| 405,476 | Great Britain | Feb. 8, 1934 |